(12) United States Patent
Connor

(10) Patent No.: US 7,286,483 B2
(45) Date of Patent: Oct. 23, 2007

(54) ELECTRONIC DATA TRANSFER BASED ON SELECTIVE STORAGE OF INCOMING PACKETS

(75) Inventor: Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1023 days.

(21) Appl. No.: 10/294,143

(22) Filed: Nov. 14, 2002

(65) Prior Publication Data

US 2004/0095935 A1 May 20, 2004

(51) Int. Cl.
*H04J 1/16* (2006.01)
*H04L 12/28* (2006.01)

(52) U.S. Cl. .............. 370/252; 370/392; 370/419
(58) Field of Classification Search ............... 370/252, 370/392, 419
See application file for complete search history.

(56) References Cited

U.S. PATENT DOCUMENTS

| | | | | |
|---|---|---|---|---|
| 5,892,924 A | 4/1999 | Lyon et al. | ............ | 395/200.75 |
| 5,920,705 A | 7/1999 | Lyon et al. | ............ | 395/200.7 |
| 6,097,697 A | 8/2000 | Yao et al. | ............ | 370/230 |
| 6,463,068 B1 * | 10/2002 | Lin et al. | ............ | 370/414 |
| 6,711,165 B1 * | 3/2004 | Tzeng | ............ | 370/392 |
| 6,760,309 B1 * | 7/2004 | Rochberger et al. | ........ | 370/235 |
| 6,856,628 B1 * | 2/2005 | Bychowsky et al. | ........ | 370/412 |
| 6,965,604 B1 * | 11/2005 | Sato et al. | ............ | 370/401 |
| 7,027,442 B2 * | 4/2006 | Shirakawa et al. | ......... | 370/392 |
| 7,035,216 B2 * | 4/2006 | Kikuchi et al. | ............ | 370/235 |
| 7,106,745 B2 * | 9/2006 | Kusumoto | ............ | 370/395.41 |
| 2002/0159388 A1 * | 10/2002 | Kikuchi et al. | ............ | 370/229 |
| 2003/0043809 A1 * | 3/2003 | Kawakami et al. | ...... | 370/395.1 |

* cited by examiner

*Primary Examiner*—Andrew C. Lee
(74) *Attorney, Agent, or Firm*—Schwegman, Lundberg & Woessner, P.A.

(57) ABSTRACT

End-to-end data transfer between computing platforms in a transport control protocol (TCP) environment is improved by restricting which packets are stored in a receive memory of an input/output (I/O) circuit. In one embodiment, received packets are examined as to type, and the number of packets stored in the receive memory is monitored. If the number of stored packets exceeds a threshold value, then subsequently received data packets are discarded, whereas latency-sensitive priority data such as acknowledgements (ACKs) are retained in the receive memory, until the number of stored packets is reduced. Various methods, as well as application of the circuit to a system and to a machine-readable article, are also described.

16 Claims, 4 Drawing Sheets

ELECTRONIC DATA TRANSFER BASED ON SELECTIVE STORAGE OF INCOMING PACKETS

BACKGROUND INFORMATION

A "computing platform", as used herein, means a hardware-based and/or software-based system having the capability to perform logic and/or arithmetic operations. It is often desirable to provide a computing platform with the capability of transmitting and receiving data between itself and one or more additional computing platforms coupled to a transmission medium. Computing platforms can include, without limitation, personal computers, laptop computers, servers, set-top boxes, hand-held devices, and numerous other such systems. A computing platform may include code in the form of instructions including, but not limited to, one or more device drivers or operating systems. Computing platforms coupled to a transmission medium may include data communications equipment such as, for example, servers, personal computers, routers, switches, and/or hubs.

Computing platforms are often coupled into a computer network such as a Wide Area Network (WAN) or a Local Area Network (LAN), just to mention two possible examples. Computer networks are typically constructed by coupling two or more computing platforms to a data transmission medium such as fiber optic cable, category 5 (CAT 5) networking cabling, and/or wireless media. These computing platforms typically access the transmission medium through an input/output (I/O) device or circuit such as a network interface card (NIC) or a LAN on motherboard (LOM). I/O devices may comprise a device or circuit capable of routing, switching, repeating, and/or passing data to or from a network. An I/O device may include a network transmitter and receiver, and an I/O controller.

Electronic data is typically exchanged by using a protocol stack in I/O devices to facilitate data transfer. A protocol stack, also known as a protocol suite, contains a number of layers, with each layer responsible for a different facet of the data transfer. Each layer typically utilizes a protocol that defines the types and formats of messages transferred by a layer to perform its facet of the data transfer. Generally, both the network receiver and the network transmitter have the same protocol stack.

A protocol stack such as a Transport Control Protocol over Internet Protocol (TCP/IP) stack is extensively used by data transfer systems to provide reliable and efficient end-to-end data streams between computers over the Internet. The TCP/IP protocol stack includes various layers, such as an application layer, transport layer, network layer, link layer, and the like.

The transport layer receives data from the application layer and facilitates the flow of data between application layers on the end systems. In the TCP/IP protocol stack, Transmission Control Protocol (TCP) is used as the transport protocol. TCP is a connection-oriented protocol that transfers data between two end systems. Before transferring data, the TCP layer on the source system establishes a connection with the TCP layer on the destination system, and then the TCP layers send all of the data to be transferred over this connection. TCP is a connection-oriented protocol, in which a connection is established before a data transfer occurs. A connection is established when the two ends of the connection have explicitly agreed to take part in the data transfer. In a connection-oriented protocol, all data is transferred over a connection, and the connection is terminated after the data transfer has completed.

The data transfer performed by TCP generally guarantees that the data will be sent correctly to the destination end system. To accomplish this, TCP (1) divides the data received from the application layer into appropriately sized packets for the network layer, (2) acknowledges all packets received, (3) sets time-outs to ensure that the destination end system acknowledges that the packets were received, and (4) performs other actions to ensure that when TCP receives data from the application layer, the corresponding TCP layer on the destination end system receives that data correctly.

It is widely accepted that the data flow control mechanism of TCP has been one of the key contributors to the robustness of the Internet. TCP's data flow control allows remote computers that may have disparate link speeds to communicate. For example, a WAN user connected via modem can connect to a server on a gigabit Ethernet link and still download files. As packets are dropped and retransmitted, TCP meters the data rate to reduce overruns on the slower link.

When a connection is initially established, TCP sends data at a slower rate to assess the bandwidth of the connection and to avoid overflowing the receiver or other infrastructure, such as routers or switches, in the network path that the frames must traverse to get from the sender to the receiver. A send window starts at a small size, typically sized to transmit two TCP packets. As TCP/IP segments are acknowledged, the send window is increased until the amount of data being sent per burst reaches the size of the receiver's window. At that point, the slow start algorithm is no longer used, and the receiver's window governs TCP flow control. However, at times during transmission, congestion can occur on a connection. If this happens (evidenced by missing acknowledgments and the need to retransmit), a congestion avoidance algorithm is used to reduce the send window size temporarily, and then to slowly increment the send window back towards the receiver's window size.

A problem with such TCP data flow control is that it is reactive instead of proactive. Packets have to be dropped before a congestion issue is recognized by TCP. Because TCP detects dropped packets by waiting for acknowledgments to time out, it can take multiple round-trip time delays before TCP considers a packet to be dropped. Additionally, TCP's congestion control is not visible to the receiver and the memory fullness state of the hardware, which is generally a significant reason for packet loss. If acknowledgments are dropped due to the memory being full, data transmission performance between sender and receiver can suffer significantly.

DETAILED DESCRIPTION

Figure 1:
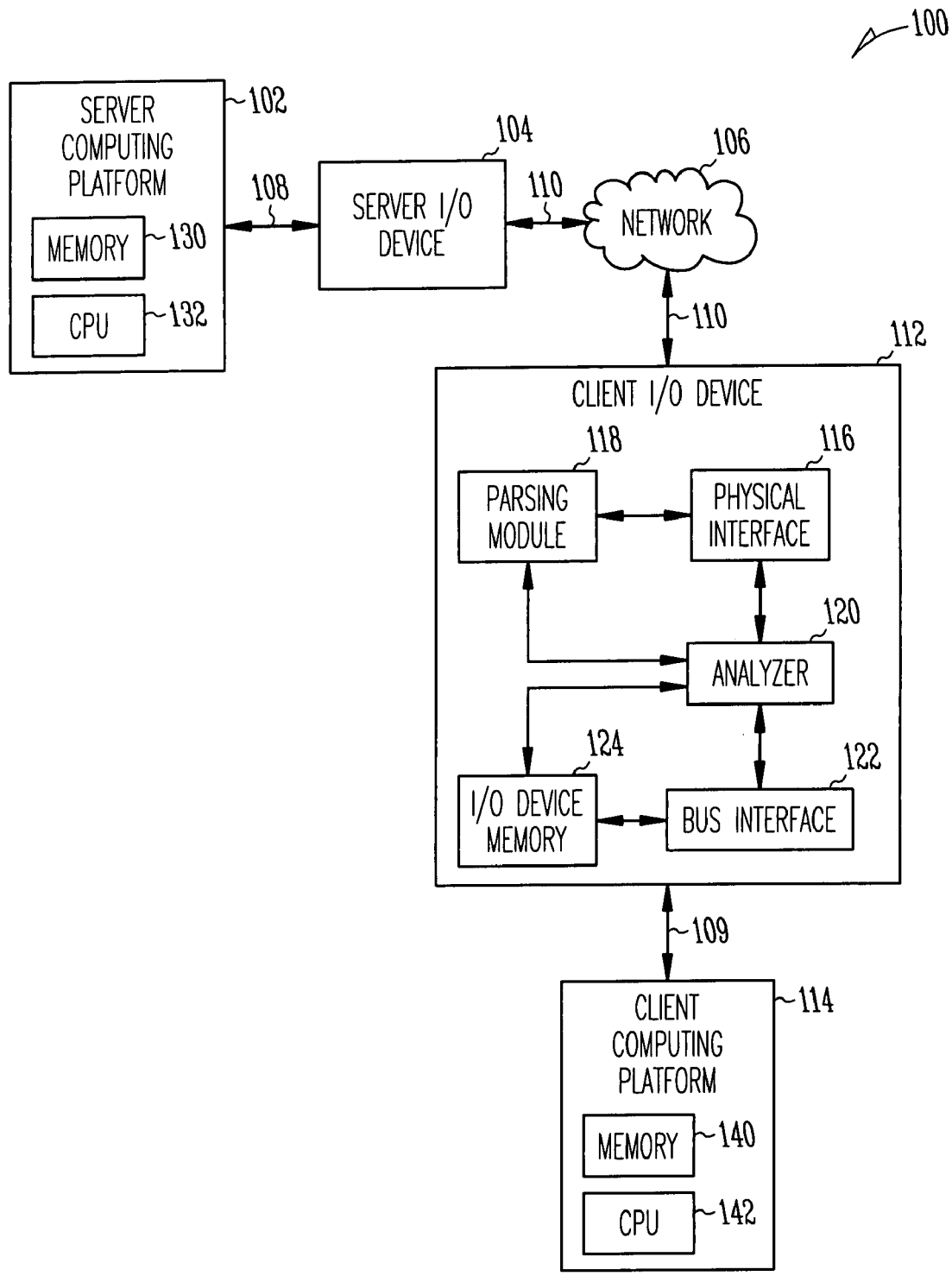
FIG. 1 is a block diagram illustrating a server computing platform, a client computing platform, and their respective input/output devices, in accordance with one embodiment of the present invention.

The following description is directed towards an improved Input/Output (I/O) controller that selectively stores or discards incoming data, such as data packets, based in part upon the availability of I/O controller memory and in part upon the type of data in the data packets. The improved I/O controller can enhance throughput and/or quality of service in data communications between computers.

The following detailed description refers to the accompanying drawings that show, by way of illustration, specific embodiments in which the subject matter may be practiced. In the drawings, like numerals describe substantially similar components throughout the several views. These embodiments are described in sufficient detail to enable those skilled in the art to practice the subject matter. Other embodiments may be utilized, and structural, logical, and electrical changes may be made without departing from the scope of the present subject matter. Moreover, it is to be understood that the various embodiments of the subject matter, although different, are not necessarily mutually exclusive. For example, a particular feature, structure, or characteristic described in one embodiment may be included within other embodiments. The following detailed description is, therefore, not to be taken in a limiting sense, and the scope of the present subject matter is defined only by the appended claims, along with the full scope of equivalents to which such claims are entitled.

FIG. 1 is a block diagram illustrating a server computing platform 102 (also referred to herein simply as a "server"), a client computing platform 114 (also referred to herein simply as a "client"), and their respective input/output devices 112 and 104, in accordance with one embodiment 100 of the present invention.

Server computing platform 102 is coupled to a server I/O device 104. Server 102 includes a memory 130 and a central processing unit (CPU) 132. Client computing platform 114 is coupled to a client I/O device 112. Client 114 includes a memory 140 and a central processing unit (CPU) 142. Further, server and client I/O devices 104 and 112, respectively, are coupled to a network 106 by a transmission medium 110.

The transmission medium 110 may be of a suitable type including, for example, fiber optic cable, category 5 (CAT-5) networking cabling, or a wireless medium such as a wireless local area network (LAN).

"Suitable", as used herein, means having characteristics that are sufficient to produce the desired result(s). Suitability for the intended purpose can be determined by one of ordinary skill in the art using only routine experimentation.

The transmission medium 110, in some embodiments, is coupled to the client I/O device 112 through a physical interface 116. The client I/O device 112 may be a network interface card (NIC), alternatively referred to as a server adapter, network adapter, or media access card (MAC). There are many types and categories of NICs, such as external NICs, onboard NICs, or peripheral NICs. One such NIC comprises an Ethernet Media Access Controller (MAC), which is available commercially from Intel Corporation, Santa Clara, Calif., as part 82544 MAC.

NICs manage data transfer between a computer and a network, and they operate using a particular type of protocol. There are many types of protocols that may be used to practice the claimed subject matter, including Ethernet, Fast Ethernet, Gigabit Ethernet, 10 Gigabit Ethernet, and 40 Gigabit Ethernet, which relate to a 10, 100, 1000, 10,000, and 40,000 Megabits per second (Mb/s) rate of electronic data transfer, respectively. Gigabit Ethernet protocol is defined for data transfer over fiber optic cable in the Institute of Electrical and Electronics Engineers (IEEE) standard 802.3z, and for data transfer over CAT 5 cable in IEEE standard 802.3ab. Details regarding this protocol can additionally be found on the World Wide Web at the following URL: http://www*gigabit-ethernet*org. (To avoid inadvertent hyperlinks, the periods in the preceding URL have been replaced by asterisks.) NICs, such as the type previously described, typically operate by utilizing at least one device driver.

In some embodiments, server I/O device 104 is coupled to server 102 via a platform bus 108, and client I/O device 112 is coupled to client 114 via a platform bus 109. Many different types of platform buses can be used in accordance with the claimed subject mater, but one such platform bus is a peripheral component interconnect (PCI) bus.

In some embodiments, apparatus for data transfer may include the client I/O device 112 as shown in FIG. 1. The role of a "client I/O device", which can be similar or identical to a "server I/O device", can be implemented through devices such as a network interface (NI), a network interface card (NIC), a server adapter, a network adapter, a media access card (MAC), and an Ethernet media access card (EMAC).

In one embodiment, client I/O device 112 comprises several components including, but not limited to, a physical interface 116, a parsing module 118, an analyzer 120, a bus interface 122, and an I/O device memory 124.

The client I/O device 112, such as a MAC, typically includes a limited amount of receive FIFO memory, which can be implemented, for example, by I/O device memory 124. For example, in one known MAC, the receive FIFO is limited to 48K bytes. Data packets generally have an average or maximum size, depending upon the protocol being used. In one known protocol, the data packets are generally around 1.5K bytes.

"Packet", as used herein, means a group of one or more bytes or other units of data information, control information, or other information. Packets, as broadly defined herein, include headers, data payloads, frames, segments (e.g. TCP segments), control characters (ranging from a single byte to multiple bytes), data fragments, and other types of or terms for data information, control information, or other information.

During operation, a MAC or other client I/O device 112 may receive packets faster than it can transfer them to the associated host memory (e.g. memory 140), so the receive FIFO memory can fill up quickly. When the receive FIFO memory has only a threshold amount, e.g. 2K bytes, of space remaining, the client I/O device 112 typically will drop subsequent data packets that are received.

Network architectures are typically designed to partition complex tasks into one or more sub-tasks, also known as "layers". A particular layer typically communicates with one or more peer layers by means of a protocol. In this context, a set of related protocols may be referred to as a protocol stack. A protocol is a set of rules and conventions that may be used when one layer communicates with another layer in an associated network.

Transmission control protocol (TCP) is an example of one layer of a layered protocol, which may also include Ethernet protocol as the media layer. One of the primary purposes of TCP is to ensure that packets of electronic data are reliably sent and received across a network. In the process of sending and receiving data packets, TCP typically utilizes an acknowledgment ("ACK") control packet, to confirm that a particular packet of electronic data was successfully delivered to a particular node on an associated network. When an I/O device operating within a TCP environment transmits a data packet, typically the I/O device that receives the data packet sends an ACK to confirm delivery. If an ACK is not received by the sending I/O device within a particular period of time, also referred to as a "timeout", the sending I/O device will typically re-send at least a portion of the electronic data.

The elapsed time between a data packet being transmitted by an I/O device and an ACK being received by the sending I/O device is commonly referred to as round trip time (RTT). Typically, in a TCP environment, electronic data transmission rates are affected by the RTT, and, typically, as RTT increases, throughput typically decreases. RTT is also affected by packet loss, which generally occurs when the I/O device memory (e.g. I/O device memory 124) becomes full. This occurs because when the I/O device memory is full, data packets as well as ACK packets can get dropped. ACK packets, unless piggybacked on a data packet, are generally small.

Electronic data transmission rates in a TCP environment are typically affected by the TCP window size. "Window size" is the amount of data that may typically be sent by an I/O device before it must wait to receive an ACK. Window size serves the primary purpose of controlling data flow and reducing data congestion across an associated network. Typically, if an ACK is dropped due to memory being full and is not received by a transmitting I/O device subsequent to the window size being met, the transmitting I/O device will not be able to send additional data.

"Latency-sensitive packet", as used herein, means a packet comprising time-sensitive information which, if not promptly processed by a receiving device (e.g. a computing platform), may potentially have an adverse affect upon data transfer performance involving the receiving device. ACK packets are one type of latency-sensitive packet, although the claimed subject matter is not limited to ACK packets. The claimed subject matter may be practiced by altering the interrupt scheme of an associated computing platform based on the receipt of a latency-sensitive packet of electronic data, such as an ACK, a packet designating length of packet, priority (802.1p, EP, or other layer), TCP port, security encryption information, and other such packets of electronic data that have a priority designation and that originate from data transfer applications, including streaming media, Voice over IP (VoIP), and/or other real-time applications.

In operation, a data stream of intermixed packets (e.g. packets containing "real" or payload data and packets containing control data such as an ACK) may be received by the client I/O device 112 from the server 102 through the server I/O device 104 associated with network 106. As stated previously, these packets may be at least partially received at the physical interface 116. The physical interface 116 can, in this embodiment, pass at least a portion of the data from the data stream to the parsing module 118. In alternative embodiments, the physical interface 116 can pass data to other components in the client I/O device 112, such as the analyzer 120 and the I/O device memory 124.

The parsing module 118, in this embodiment, performs the role of checking the contents of the received packets for certain characteristics, such as packet type, e.g. whether the packet comprises payload data or some other type of information. In some embodiments, the contents comprise latency-sensitive data, such as ACK data, length of the received packet, priority designation, transport control protocol (TCP) port, and security encryption information.

The parsing module 118 can determine whether the packet comprises acknowledgment (ACK) data one or more priority designations, and other such latency-sensitive data. Parsing modules are well known in the art, and the claimed subject matter is not limited to a particular type of parsing module.

In some embodiments, parsing module 118 passes information about the characteristics of a packet to analyzer 120. Subsequently, parsing module 118, in this embodiment, passes at least a portion of the packet to the I/O device memory 124. In some embodiments, the parsing module 118 checks the contents of selected ones of the received packets and classifies the packets based on the latency-sensitive data. In such embodiments, parsing module 118 checks the contents of the received packets for the latency-sensitive data and separates the packets into "real" data packets (e.g. payload packets) and latency-sensitive data packets. Analyzer 120 then stores the separated latency-sensitive data packets and drops the real data packets when the determined number of stored packets is greater than a first threshold number (refer to 330, FIG. 3). In some embodiments, parsing module 118 separates the received packets into ACK packets and data packets and stores the ACK packets when the determined number of stored packets is greater than the first threshold number.

Client I/O device 112 then processes the received packets by storing or dropping, at least partly, the received non-ACK or payload data packets based on the availability of receive FIFO memory and the outcome of the investigation of the contents of the received packets.

Analyzer 120, in this embodiment, selectively stores a portion of the received packets in the I/O device memory 124 based upon the amount of available memory falling below a threshold amount of memory.

"Portion", as used herein, means at least some and may further mean all.

In some embodiments, analyzer 120 receives packets from physical interface 116 and stores the packets in the I/O device memory 124. Analyzer 120 then determines the number of packets stored in I/O device memory 124. Analyzer 120 further compares the determined number of stored packets to a first threshold number. In some embodiments, analyzer 120 determines the number of data packets and ACK packets stored in I/O device memory 124.

Parsing module 118 receives, at least partly, packets from the physical interface 116 and investigates the contents of the received packets for latency-sensitive packets. Parsing module 118 then separates the investigated latency-sensitive packets from the received packets. In some embodiments, parsing module 118 investigates the contents of the received packets for ACK packets.

Analyzer 120 then stores the separated latency-sensitive packets and drops the associated data packets based on the outcome of the comparison. In some embodiments, analyzer 120 stores the ACK packets and drops the data packets when the number of stored packets is greater than or equal to the first threshold number, i.e. when the available memory capacity of I/O device memory 124 is less than a first amount.

In some embodiments, analyzer 120 further compares the number of stored packets to a second threshold number, and analyzer 120 stores data packets, ACK packets, and other latency-sensitive packets based on the outcome of the comparison. In some embodiments, analyzer 120 stores data packets, ACK packets, and other latency-sensitive packets when the number of stored packets is less than or equal to the second threshold number, i.e. when the available memory capacity of I/O device memory 124 is greater than or equal to a second amount.

Bus interface 122, coupled to analyzer 120 and I/O device memory 124, is used for transmitting stored data packets to client 114 via platform bus 109. In addition, bus interface 122 transmits stored ACK packets to server 102 through network 106.

Figure 2:
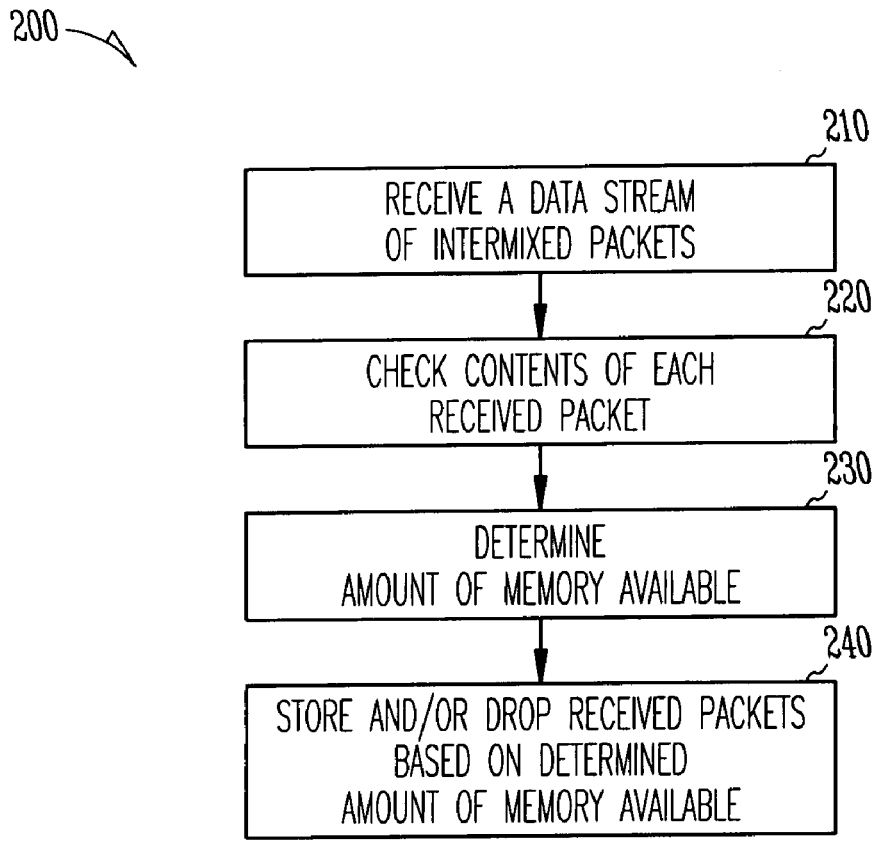
FIG. 2 is a flowchart illustrating a method for transferring data between computing platforms, in accordance with one embodiment of the present invention.

FIG. 2 is a flowchart 200 illustrating a method for transferring data between computing platforms, in accordance with one embodiment of the present invention.

Block 210 receives a data stream of intermixed packets. In some embodiments, packet types include data packets and latency-sensitive packets. The latency-sensitive packets include data such as acknowledgment (ACK) data, length of the received packet, priority designation, transport control protocol (TCP) port, and security encryption information. In a TCP protocol environment, the latency-sensitive packets include ACK packets.

Block 220 checks the contents of each received packet and classifies the packet into one of multiple different types in response to its contents. In some embodiments, checking the contents of each received packet includes investigating each received packet for latency-sensitive data. In some embodiments, each received packet is not necessarily checked.

Block 230 determines an amount of memory available to store the received stream of packets. In the embodiment illustrated in FIG. 1, the available memory would be in I/O device memory 124.

Block 240 stores a portion (e.g. at least some) of the types of packets based upon the amount of receive memory available falling below a threshold amount of memory. In some embodiments, storing the received packets includes storing and/or dropping, at least partly, some packets to improve the end-to-end electronic data transfer between the computing platforms.

In some embodiments, storing at least some of the types of the received packets includes storing latency-sensitive packets and dropping data packets based upon the amount of memory available falling below the threshold amount of available memory.

In some embodiments, storing at least some of the types of the received packets includes storing ACK data packets and dropping data packets based upon the amount of memory available falling below the threshold amount of memory. Dropping data packets and storing latency-sensitive packets, such as ACK packets, improves the data transfer efficiency of data transmissions between data communications equipment such as, but not limited to, that illustrated and described in the various embodiments of the present invention.

Figure 3:
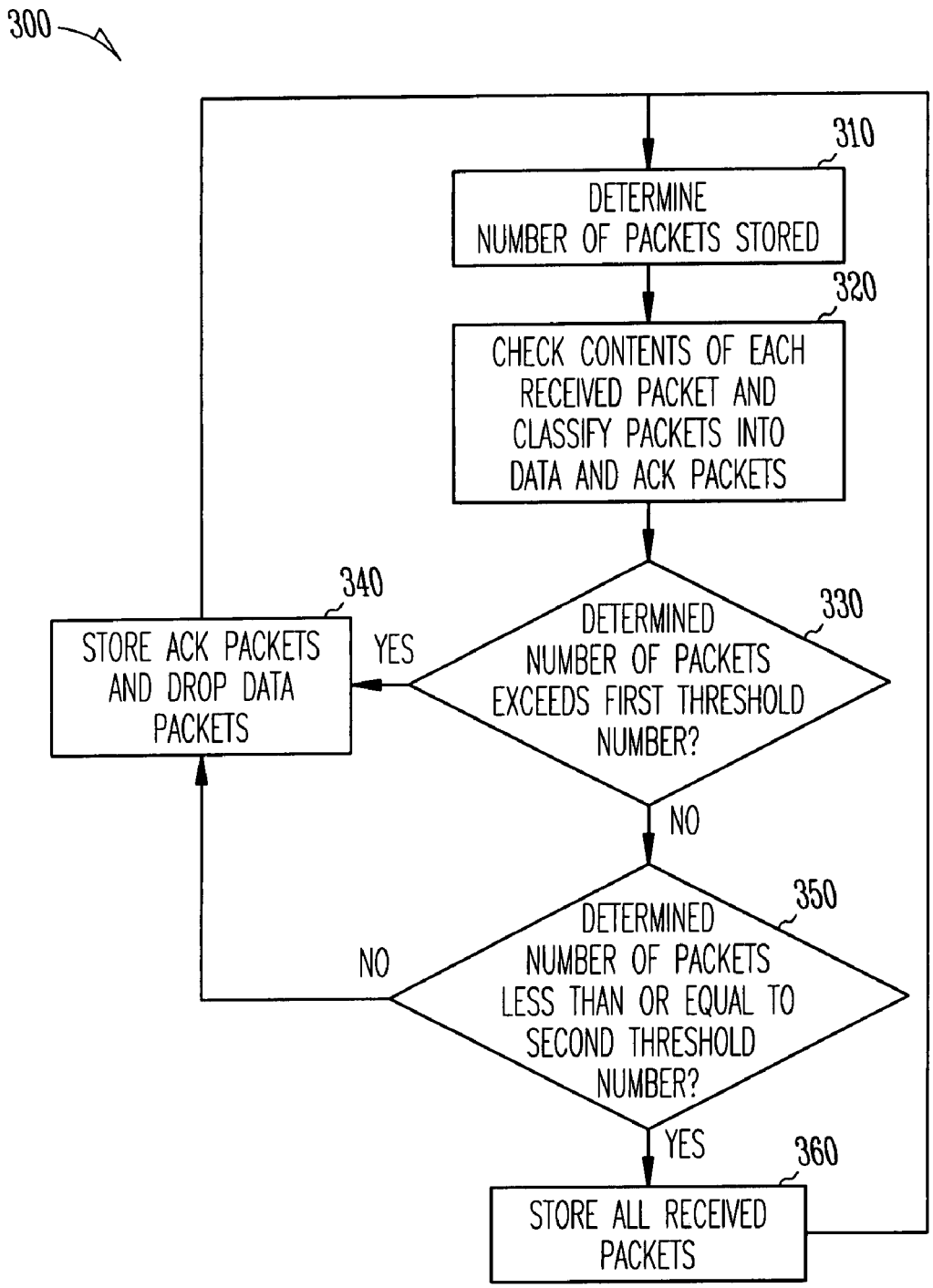
FIG. 3 is a flowchart illustrating a method for transferring data between computing platforms, in accordance with an embodiment of the present invention.

FIG. 3 is a flowchart 300 illustrating a method for transferring data between computing platforms, in accordance with an embodiment of the present invention.

Block 310 determines the number of packets stored in the receive memory (e.g. I/O device memory 124, FIG. 1). Packets can include data packets and/or ACK packets.

Block 320 checks the contents of each received packet for ACK data and classifies the received packets into data and ACK data packets. In a different embodiment, block 320 could be performed prior to block 310. In another embodiment, each received packet is not necessarily checked.

Block 330 checks whether the determined number of packets stored in the memory exceeds a first threshold number. If so, the process goes to 340; if not, it proceeds to 350.

Block 340 stores the ACK packets and drops data packets when the determined number of packets stored in the memory exceeds the first threshold number. From block 340, the process can return to block 310.

Block 350 checks whether the determined number of packets stored in the memory is less than or equal to a second threshold number. If so, the process goes to 360; if not, it goes to 340.

Block 360 stores a relatively greater portion of the received packets, e.g. all of the received packets in some embodiments. In some embodiments, storing a relatively greater portion of the packets includes storing the ACK and data packets based upon the determined number of packets stored in the memory being less than or equal to the second threshold number. From block 350, the process can return to block 310.

Various embodiments of the present subject matter shown in FIGS. 1-3 can be implemented in software, which may be run in the environment shown in FIG. 4 (to be described below) or in another suitable computing environment. The present subject matter is operable in a number of general purpose or special purpose computing environments. Some computing environments include personal computers, general-purpose computers, server computers, hand-held devices (including but not limited to telephones and personal digital assistants of all types), laptop devices, multi-processors, microprocessors, set-top boxes, programmable consumer electronics, network computers, minicomputers, mainframe computers, distributed computing environments and the like. The present subject matter may be implemented in part or in whole as, machine-executable instructions, such as program modules that are executed by a computer. Program modules include routines, programs, objects, components, data structures and the like to perform particular tasks or to implement particular abstract data types. In a distributed computing environment, program modules may be located in local or remote storage devices.

Figure 4:
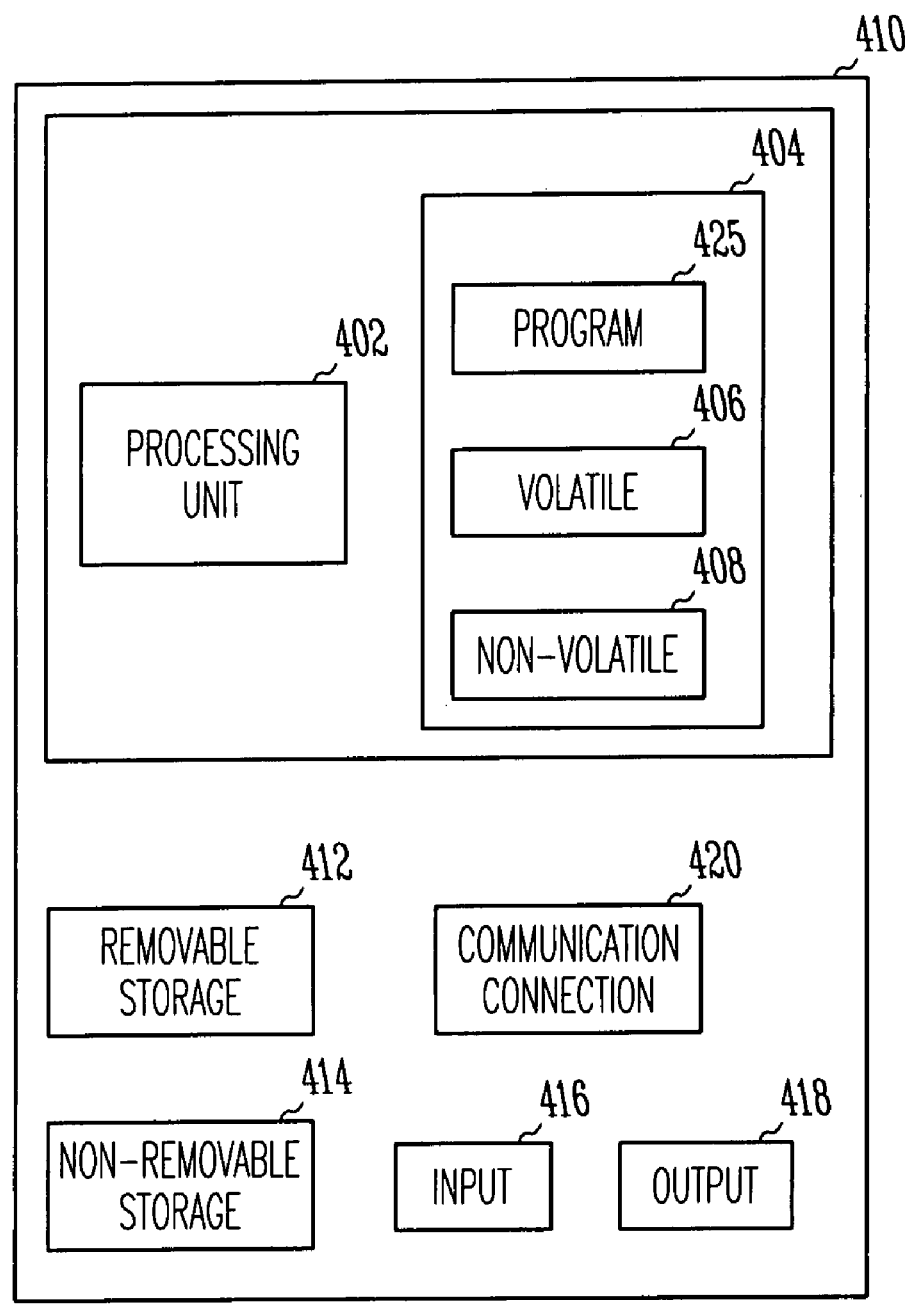
FIG. 4 shows an example of a suitable computing system environment for implementing embodiments of the present invention.

FIG. 4 shows an example of a suitable computing system environment for implementing embodiments of the present invention. FIG. 4 and the following discussion are intended to provide a brief, general description of a suitable computing environment in which certain embodiments of the inventive concepts contained herein may be implemented.

A general computing device in the form of a computer 410 may include a processing unit 402, memory 404, removable storage 412, and non-removable storage 414. Memory 404 may include volatile memory 406 and non-volatile memory 408. Computer 410 may include or have access to a computing environment that includes a variety of machine-readable media, such as volatile memory 406 and non-volatile memory 408, removable storage 412 and non-removable storage 414.

Computer storage can include one or more suitable memory device(s) for storing data and machine-readable instructions, such as read only memory (ROM); random access memory (RAM); erasable programmable read only memory (EPROM); electrically erasable programmable read only memory (EEPROM); hard drive; removable media drive for handling compact disks (CDs), digital versatile disks (DVDs), diskettes, magnetic tape cartridges, memory cards, memory sticks, and the like; chemical storage; biological storage; and other types of data storage.

Computer 410 may include or have access to a computing environment that includes one or more input elements 416, one or more output elements 418, and one or more communication connections 420. The computer 410 may operate in a networked environment using a communication connection 420 to connect to one or more remote computers. A remote computer may include a personal computer, server, router, network computer, a peer device or other common network node, and the like. The communication connection may include a Local Area Network (LAN), a Wide Area Network (WAN), or other networks.

"Processor" or "processing unit", as used herein, means a computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor, or other type of processor or processing circuit. The term also includes embedded controllers, such as Generic or Programmable Logic Devices or Arrays, Application Specific Integrated Circuits, single-chip computers, smart cards, and the like.

Embodiments of the invention may be implemented in conjunction with program modules, including operations, procedures, data structures, application programs, etc. for performing tasks, or defining abstract data types or low-level hardware contexts. Program modules may be stored in memory 404 and associated storage media of the type(s) mentioned above.

Machine-readable instructions stored on the above-mentioned storage media are executable by the processing unit 402 of the computer 410. For example, a computer program 425 comprising machine-readable instructions capable of transferring electronic packets between computing platforms according to the teachings of the present subject matter may be included in a CD-ROM and loaded from the CD-ROM to a hard drive. The machine-readable instructions cause the computer 410 to transfer the electronic packets between computing platforms according to the teachings of the present subject matter.

In the flowcharts 200 and 300 of FIGS. 2 and 3, respectively, the operational blocks are arranged serially in the exemplary embodiments. However, other embodiments of the subject matter may execute two or more blocks in parallel, using multiple processors or a single processor organized as two or more virtual machines or sub-processors. Moreover, still other embodiments implement the blocks as two or more specific interconnected hardware modules with related control and data signals communicated between and through the modules, or as portions of an application-specific integrated circuit. Thus, the exemplary process flow is applicable to software, firmware, and/or hardware implementations.

CONCLUSION

The above-described methods and apparatus provide various embodiments to improve data transfer between computing platforms. These embodiments include receiving intermixed packets and selectively storing or discarding the received packets based in part upon available I/O device receive memory and in part upon the type of data in the received packets, to improve data transmission performance.

As shown herein, the present invention can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described above with respect to the methods illustrated in FIGS. 2 and 3 can be performed in a different order from those shown and described herein.

FIGS. 1-4 are merely representational and are not drawn to scale. Certain proportions thereof may be exaggerated, while others may be minimized. FIGS. 1-4 are intended to illustrate various embodiments of the invention that can be understood and appropriately carried out by those of ordinary skill in the art.

It is to be understood that the above description is intended to be illustrative, and not restrictive. Many other embodiments will be apparent to those of skill in the art. The scope of the subject matter should, therefore, be determined with reference to the following claims, along with the full scope of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description of Embodiments of the Invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Embodiments of the Invention, with each claim standing on its own as a separate preferred embodiment.

What is claimed is:

1. A circuit comprising:
   a parsing module to receive a data stream from a network and to separate acknowledgement packets from data packets in the data stream; and
   an analyzer, coupled to the parsing module and to a memory, to determine the available capacity of the memory, and to selectively store the acknowledgement packets and a portion of the data packets into the memory based upon the available capacity being less than a threshold amount and wherein the analyzer is to store the acknowledgement packets and drop the data packets based upon the determined number of stored packets being greater than or equal to the threshold number.

2. The circuit recited in claim 1, wherein the circuit is an input/output (I/O) device from the group consisting of a client I/O device, a server I/O device, a network interface, a network interface card, a server adapter, a network adapter, a media access card, and an Ethernet media access card.

3. An input/output (I/O) device comprising:
   an interface to receive a data stream of intermixed packets from a network;
   an I/O device memory to store the packets;
   an analyzer to determine an amount of I/O device memory available to store the packets; and
   a parsing module to check the contents of the packets and to classify selected packets based on latency-sensitive data and to separate the packets into data packets and ACK data packets,
   wherein the analyzer is to store a portion of the packets into the I/O device memory based upon a comparison of the amount of I/O device memory available with a threshold amount and, the analyzer is to store the ACK packets and to drop the data packets based upon the determined number of stored packets being greater than or equal to the first threshold number.

4. The device of claim 3, wherein the analyzer is to compare the determined number of stored packets to a second threshold number and to store a relatively greater portion of the received packets based upon the determined number of stored packets being less than or equal to the second threshold number.

5. The device of claim 4, wherein the I/O device further comprises:
a bus interface coupled to the analyzer and the I/O device memory to transmit the stored data packets to a client.

6. The device of claim 4, wherein the I/O device further comprises:
a bus interface coupled to the analyzer and the I/O device memory to transmit the stored ACK packets to a server through the network.

7. A method comprising:
receiving a stream of intermixed packets;
checking the contents of the packets and classifying the packets into one of multiple different types including data packets and acknowledgement (ACK) data;
determining an amount of memory available to store the packets; and
storing a relatively greater portion of the packets based on the outcome of the comparison.

8. The method of claim 7 wherein, in storing, the latency-sensitive packets comprise latency-sensitive data from the group consisting of acknowledgment (ACK) data, length of a received packet, priority designation, transport control protocol (TCP) port, and security encryption information.

9. The method of claim 8, wherein receiving comprises: receiving ACK packets in a TCP protocol environment.

10. The method of claim 9, wherein storing comprises:
storing ACK packets and dropping data packets based upon the amount of memory available falling below the threshold amount.

11. The method of claim 10, wherein storing ACK packets and dropping data packets based upon the amount of memory available falling below the threshold amount comprises:
determining the number of packets stored in the memory;
checking the contents of selected packets for ACK data and classifying the packets into data and ACK packets;
comparing the determined number of stored packets in the memory to a first threshold number; and
storing the ACK packets and dropping the data packets based upon the determined number of stored packets exceeding the first threshold number.

12. The method of claim 11, wherein storing the packets further comprises:
comparing the determined number of stored packets to a second threshold number; and
latency-sensitive data from the group consisting of acknowledgment (ACK) data, length of a received packet, priority designation, transport control protocol (TCP) port, and security encryption information.

13. The method of claim 12, wherein storing a relatively greater portion of the packets comprises:
storing the data and ACK packets based upon the determined number of stored packets being less than or equal to the second threshold number.

14. A system comprising:
a processor;
a host memory coupled to the processor; and
an input/output (I/O) device coupled to the host memory and to a network interface, the I/O device to control the transfer of data from the network interface to the host memory by performing:
receiving a data stream of intermixed packets from the network interface;
checking the contents of the packets and classifying the packets into first and second types of packets;
determining an amount of memory available to store the packets; and
storing only the first types of packets when the amount of memory available falls below a threshold amount and discarding those packets when the amount of memory available falls below the threshold amount.

15. The system of claim 14, wherein the first and second packet types comprise latency-sensitive packets and data packets.

16. The system of claim 15, wherein the contents of the latency-sensitive packets comprise:
storing the ACK data and a portion of the data packets based upon the amount of memory available falling below a threshold amount and dropping data packets based on the amount of memory falling below the threshold amount.

* * * * *

UNITED STATES PATENT AND TRADEMARK OFFICE
CERTIFICATE OF CORRECTION

PATENT NO. : 7,286,483 B2
APPLICATION NO. : 10/294143
DATED : October 23, 2007
INVENTOR(S) : Connor It is certified that error appears in the above-identified patent and that said Letters Patent is hereby corrected as shown below:

In column 10, line 64, in Claim 3, delete "and," and insert -- and --, therefor.

In column 11, lines 23-24, in Claim 7, after "storing" delete "a relatively greater portion of the packets based on the outcome of the comparison." and insert -- the ACK data and a portion of the data packets based upon the amount of memory available falling below a threshold amount and dropping data packets based on the amount of memory falling below the threshold amount. --, therefor.

In column 12, lines 6-9, in Claim 12, delete "latency-sensitive data from the group consisting of acknowledgment (ACK) data, length of a received packet, priority designation, transport control protocol (TCP) port, and security encryption information." and insert -- storing a relatively greater portion of the packets based on the outcome of the comparison. --, therefor.

In column 12, lines 41-45, in Claim 16, delete "storing the ACK data and a portion of the data packets based upon the amount of memory available falling below a threshold amount and dropping data packets based on the amount of memory falling below the threshold amount." and insert -- latency-sensitive data from the group consisting of acknowledgment (ACK) data, length of a received packet, priority designation, transport control protocol (TCP) port, and security encryption information. --, therefor.

Signed and Sealed this

Eighth Day of April, 2008

JON W. DUDAS
*Director of the United States Patent and Trademark Office*